F. HUBERT.
DUST PAN.
APPLICATION FILED DEC. 17, 1908.
956,968.
Patented May 3, 1910.
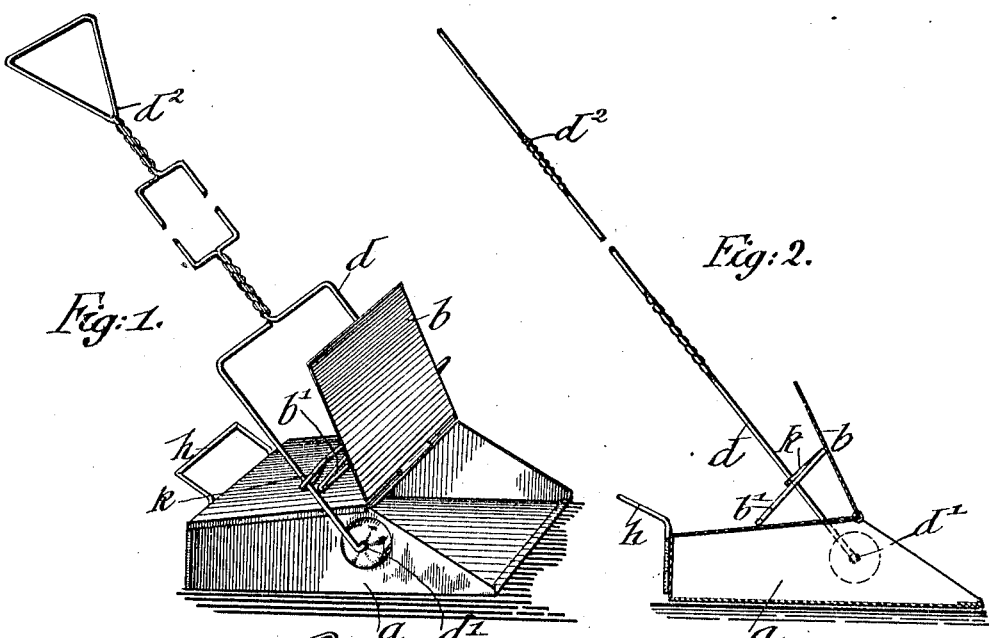
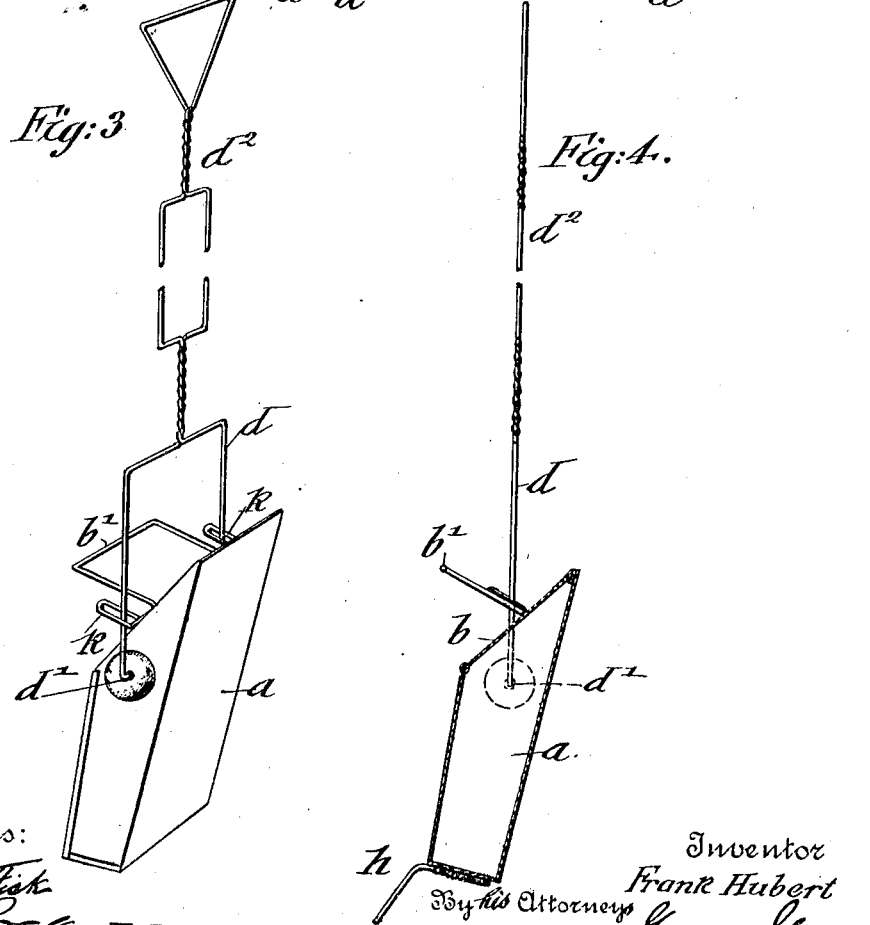
Witnesses:
Fannie Fisk
N. E. Rockwood
Inventor
Frank Hubert
By his Attorneys

UNITED STATES PATENT OFFICE.

FRANK HUBERT, OF NEW YORK, N. Y.

DUST-PAN.

956,968.      Specification of Letters Patent.      Patented May 3, 1910.

Application filed December 17, 1908. Serial No. 467,973.

*To all whom it may concern:*

Be it known that I, FRANK HUBERT, a citizen of the United States of America, residing in New York, in the borough of Manhattan, county and State of New York, have invented certain new and useful Improvements in Dust-Pans, of which the following is a specification.

This invention relates to dust-pans and more particularly to dust-pans of that type in which the body or pan proper is provided with a suspension-bail so connected with the lid of the dust-pan that the latter is automatically closed when the pan is suspended by the bail.

The object of the invention is to provide an improved connection between the suspension-bail and the lid, the suspension-bail for this purpose being connected with the ends of the stay applied to the back of the lid and adapted to support the lid in open position. In this way the stay not only serves its usual function of arresting the lid in the proper position, but it also serves as the connecting means between the lid and the suspension-bail.

In the accompanying drawings, Figure 1 represents a perspective view of my improved dust-pan shown in open position for receiving the dust, Fig. 2 is a vertical longitudinal section of the device in the position shown in Fig. 1, Fig. 3 is a perspective view showing the manner in which the dust-pan is carried from place to place, and Fig. 4 is a vertical longitudinal section through the parts when in the position shown in Fig. 3.

Similar letters of reference indicate corresponding parts throughout the several figures.

Referring to the drawings, $a$ represents a box-shaped pan, which is open at one end and provided with tapering side-walls. To the upper edge of the box-shaped pan is hinged a lid $b$, which is provided at opposite sides with keepers $k$ through which a U-shaped bail $d$ is passed, said bail being provided with inwardly-turned ends which are pivoted at $d^1$ to the side-walls of the pan. The bail is provided with a handle $d^2$ of suitable length for placing the lid in open or closed position. The pivot connection between dust-pan and bail is made near the hinge connection of the lid with the same, that is to say, sufficiently above the center of the box so that when the pan is lifted it is tilted by gravity into approximately vertical position on the pivot-ends of the bail. To the rear-part of the lid $b$ is applied a stay $b^1$, made of the same piece of wire from which the keepers $k$ are formed, and serving to support the lid, bail and handle in inclined position, as shown in Figs. 1 and 2, when the pan is to be used for collecting dust. The wire stay $b^1$, which is preferably bent into U-shape, as shown in Fig. 3, is adapted to abut with its intermediate connecting portion against the top-wall of the pan, as shown in Fig. 2, in order to hold the lid and suspension-bail in the position indicated. As the keepers $k$ are bent up from the stay at the ends of the same, the stay not only serves to hold the lid and suspension-bail in inclined position, but it also serves as a connection between the lid and bail. To the rear-end of the box-shaped pan is applied a handle $h$. The main-part of the box is preferably made narrow from the front-part toward the rear-part.

When the improved dust-pan is to be used, the handle is placed in inclined position, so that the lid is moved into open position. The collected dust is swept by the broom into the pan. This is continued from time to time, until the dust brushed together in one or more rooms is collected in the pan, after which the handle is taken hold of and the pan lifted away from the floor, so that the pan swings automatically into vertical position, while the lid is closed at the same time by the connection of the bail with the same. In this position the dust-pan is carried to the dust-receptacle, and then emptied into the same by taking hold of the handle of the pan with one hand, and opening the lid by means of the bail with the other hand.

By the improved dust-pan the dust can be conveniently gathered and removed to the dust-receptacle, while the lid is held in closed position, and without the objectionable features of the well-known open dust-pans in use.

Having thus described my invention, I claim as new and desire to secure by Letters Patent.

1. In a dust-pan, the combination of a pan, a lid hinged to the same, a suspension-bail for the pan, and a stay on the lid provided with ears, said stay resting on the top of the pan to support the lid and bail in upwardly-inclined position and connecting the lid with the bail so that the lid is automatically closed when the pan is suspended by the bail.

2. In a dust-pan, the combination of a pan, a lid hinged thereto, a stay on the back of the lid formed of a single piece of wire and provided with ears at right angles to the lid, and a suspension-bail pivoted to the pan and guided in the ears of said stay.

3. In a dust-pan, the combination of a pan, a lid hinged to the same, a bail pivoted to the pan, a wire-stay on the lid arranged to rest by its intermediate connecting portion on the top-wall of the pan to support the lid and bail in open position, and ears formed integral with the stay and at right angles with the lid.

In testimony, that I claim the foregoing as my invention, I have signed my name in presence of two subscribing witnesses.

FRANK HUBERT.

Witnesses:
    PAUL GOEPEL,
    HENRY J. SUHRBIER.